United States Patent [19]

Miki et al.

[11] Patent Number: 4,609,332

[45] Date of Patent: Sep. 2, 1986

[54] TURBO-MOLECULAR PUMP

[75] Inventors: Masaharu Miki; Chiaki Urano, both of Tokyo, Japan

[73] Assignee: Seiko Seiki Kabushiki Kaisha, Chiba, Japan

[21] Appl. No.: 553,180

[22] Filed: Nov. 18, 1983

[30] Foreign Application Priority Data

Nov. 19, 1982 [JP] Japan .................. 57-203263

[51] Int. Cl.⁴ ............................................. F04B 17/00
[52] U.S. Cl. ..................................... 417/352; 417/365; 417/424; 415/90; 310/90.5
[58] Field of Search ............... 417/424, 352, 353, 354, 417/365; 308/10; 415/90

[56] References Cited

U.S. PATENT DOCUMENTS

| | | | |
|---|---|---|---|
| 3,860,300 | 1/1975 | Lyman | 308/10 |
| 3,954,310 | 5/1976 | Rava | 308/10 |
| 4,023,920 | 5/1977 | Bächler et al. | 417/424 |
| 4,036,565 | 7/1977 | Becker | 308/10 |
| 4,080,012 | 3/1978 | Boden et al. | 308/10 |
| 4,082,376 | 4/1978 | Wehde et al. | 308/10 |
| 4,088,379 | 5/1978 | Perper | 308/10 |
| 4,111,595 | 9/1978 | Becker et al. | 417/424 |
| 4,141,604 | 2/1979 | Habermann et al. | 308/10 |
| 4,268,095 | 5/1981 | Millner | 308/10 |
| 4,312,628 | 1/1982 | Yamamura | 417/424 |
| 4,340,261 | 7/1982 | Wehde | 308/10 |
| 4,405,286 | 9/1983 | Studer | 417/1 |

FOREIGN PATENT DOCUMENTS 1475765  4/1967  France .

Primary Examiner—Carlton R. Croyle
Assistant Examiner—Donald E. Stout
Attorney, Agent, or Firm—Robert E. Burns; Emmanuel J. Lobato; Bruce L. Adams

[57] ABSTRACT

A turbo-molecular pump characterized in that three out of five degrees of freedom except the rotation around the rotational axis of a shaft are actively controlled constrainingly by a pair of magnetic radius direction bearings and a pair of magnetic axial bearings, a bell-shaped rotor provided to cover the whole of magnetic bearing and a shaft which is supported by a magnetic bearing passively constraining the remaining two degrees of freedom, and said rotor is rotated at high speed by an inner-rotor type of a driving motor provided between a radius direction bearing and axial bearing.

6 Claims, 6 Drawing Figures

TURBO-MOLECULAR PUMP

BACKGROUND OF THE INVENTION

The present invention relates to a turbo-molecular pump utilizing a magnetic bearing for contactlessly supporting a bell-shaped rotor by a combination of electromagnets and permanent magnets or only by electromagnets.

Though various types of turbo-molecular pumps have been proposed in which a rotor with radial blades is rotationally driven at high speed, such pumps have had various problems relating to the supporting portion (bearing portion) of the rotor on account of the high speed rotation of the rotor.

In a well-known conventional type of turbo-molecular pump in which a rotor is supported by a mechanical bearing which requires lubrication oil, hydrocarbons which have separated from the oil do not flow backward to an intake port while the pump is operating due to the gas current flowing from the intake port to an exhaust port. However, there is a possibility that the hydrocarbons may flow backward by diffusion to reach the intake port during the inoperative state of the pump when the gas current is stopped. The presence of such hydrocarbons is unacceptable in experiments pertaining to surface physics, etc., and this disadvantage has resulted in the restricted range of utilization of the conventional turbo-molecular pump or a need for an expensive valve for preventing reverse gas current flow. Further, the rotational speed of a turbo-molecular pump whose capacity increases according to the rotational speed of the blade, is limited to a certain value since the mechanical bearing wears faster as the rotational speed increases.

Another type of turbo-molecular pump employing a five axes controlled type of magnetic bearing is disclosed in Japanese Publication No. 30998/82 and comprises a rotor supported contactlessly by the use of one axial magnetic bearing and two radius direction magnetic bearings. This pump has an advantage that hydrocarbons do not flow to the intake port side since oil lubrication is not required. However, since five degrees of freedom of the rotor other than the rotation are actively controlled in such a pump, five pairs of controlling loops consisting a position sensor, a gain/phase compensating circuit, an electromagnet driving circuit and an electromagnet are required, which results in increased cost and enlargement in the size of the pump due to a more complicated bearing construction and control circuit as compared with a mechanical bearing system. Further, in this type of pump, though the bearing is free from wear due to the contactless supporting, the service life thereof is restricted by the reliability of the circuit. Therefore, the service life is not so long due to the large number of the circuit elements, and further, the rotational speed cannot be raised higher for fear of centrifugal force acting, during rotation, on an electromagnetic steel plate of weaker material strength, because of an outer-rotor type of turbo-molecular pump. As described above, in this system, the desirable characteristic of the contactless supporting is not sufficiently utilized.

To overcome these disadvantages, another turbo-molecular pump employing a magnetic bearing which is simple in construction and circuit design is disclosed in Japanese Patent Publication No. 12095/81 and in which only the axial direction is actively controlled and the other four degrees of freedom relating to the radius direction are passively controlled. However, it is not practically used for the reasons that when the rotational speed of the rotor is increased beyond the resonance point of the system, the rotor undergoes a whirling motion which lasts too long due to inadequate attenuation in the radius direction.

Further, a tubo-molecular pump comprising a magnetic bearing for the upper part and a mechanical bearing for the lower part is disclosed in U.S. Pat. No. 3,749,528. However, this type of pump does not fully make use of the advantages of a magnetic bearing, such as no need for oil lubrication and complete contactless support of the rotor.

SUMMARY OF THE INVENTION

The present invention seeks to overcome the above disadvantages, and the objects of the present invention are to provide a turbo-molecular pump capable of stable rotation of an oil-free rotor and which has high reliability, miniaturization, reduced cost and can undergo rotation at a higher speed as compared with the conventional five axes controlled type of magnetic bearing. These objects are achieved by a magnetic bearing in a turbo-molecular pump in which three out of the five degrees of freedom excluding that of the rotor rotation are actively controlled and the remaining two degrees of freedom are passively supported constrainingly, and by using an inner-rotor system for rotating the rotor.

BRIEF DESCRIPTION OF THE DRAWINGS

FIG. 1 is a longitudinal sectional view showing one embodiment of the present invention.

Figure 1:
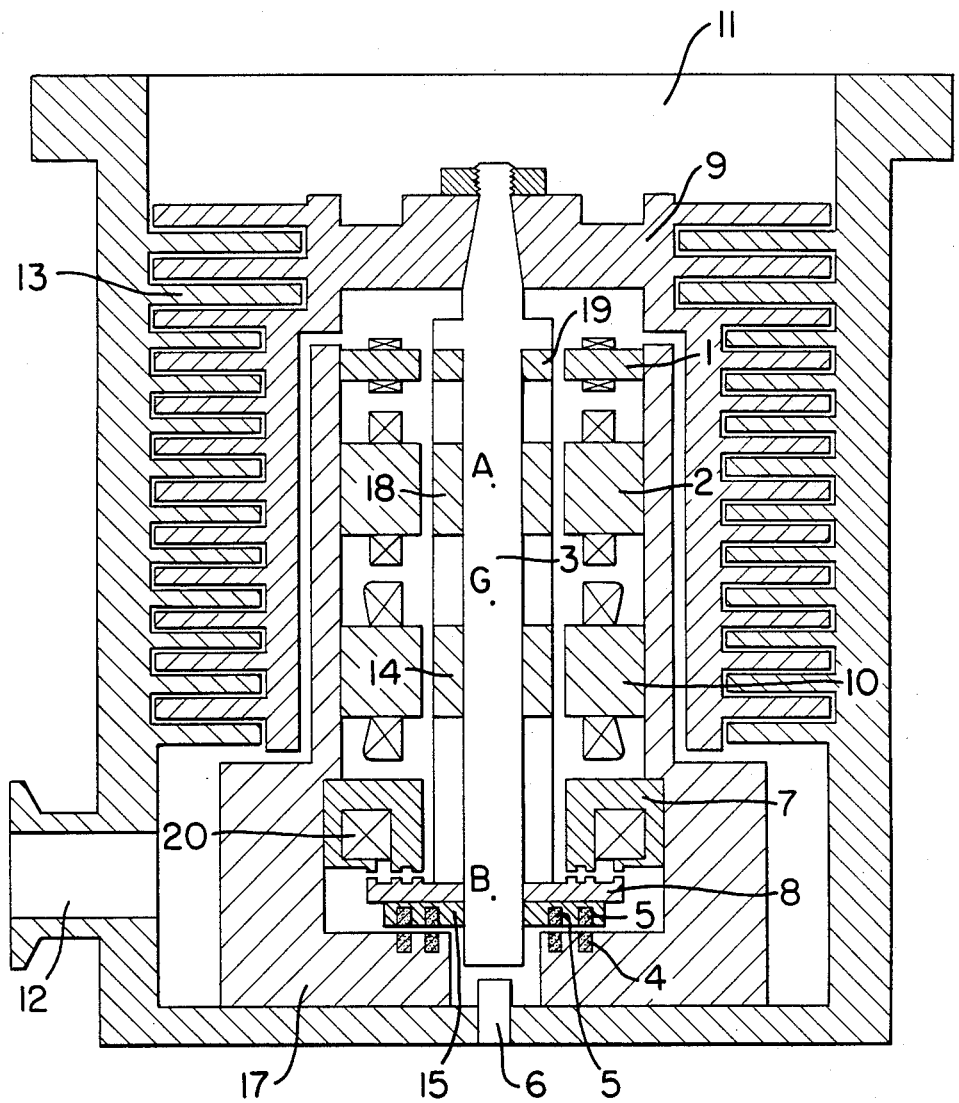
FIG. 1 is a longitudinal sectional view showing an embodiment of turbo-molecular pump according to the principles of the present invention.

The amount of the radial displacement of a rotor shaft 3 from the balancing point in the radius direction is detected by a radius direction displacement sensor 1 which produces a corresponding electric signal which is applied to gain/phase compensating circuits and electromagnet driving circuits (neither of which are shown), and a radius direction electromagnet 2 is accordingly driven by the signal. As a result, the shaft 3 is radially displaced and keeps at a given radius direction balancing point. Since two orthogonal radius directions, a certain direction and another linear-independent direction, should be controlled for actively controlling the radius direction, two pairs of the gain/phase compensating circuits and the electromagnet driving circuits are required.

With respect to the axial direction, a stator side permanent magnet 4 and a rotor side permanent magnet 5 are arranged to attract each other in such a way that the shaft 3 is always attracted to the stator side permanent magnet 4. The amount of axial displacement of the shaft 3 from the balancing point is detected by an axial direction displacement sensor 6 which produces a corresponding electric signal for controlling the coil current flowing through an axial direction electromagnet 7 through a gain/phase compensating circuit and an electromagnet driving circuit (neither of which is shown) in accordance with the signal. As a result, the forces attracting the shaft 3 to the stator side permanent magnet 4 and in the opposite direction are controlled and the shaft 3 is axially displaced and kept at a given axial balancing point. In this case, only one set of the gain/phase compensating circuit and the electromagnet driving circuit is required.

The conventional five axes controlled type of magnetic bearing requires another combination of a sensor, electromagnets and circuits to be set at another place along the shaft 3 for actively controlling the position of the rotor in the radius direction in addition to the above-mentioned elements. However, in the present invention, those additional elements can be eliminated by making the axial electromagnet 7, the stator side permanent magnet 4 and rotor side permanent magnet 5 to serve these operations. That is, since the attracting force of the axial direction electromagnet 7 acts oppositely against the forces of the stator and rotor side permanent electromagnets 4, 5 in the axial direction in the balanced state, the positions of an armature-disc 8 and the rotor side permanent electromagnets 5 are radially displaced against the axial direction electromagnet 7 and the stator side permanent electromagnet 4 in the radius direction when the shaft 3 is radially displaced from the balancing point, and a righting moment acts in proportion to the amount of the displacement of the shaft 3 to return the shaft 3 to the original position. The position of the shaft 3 in the radius direction is passively restricted and urged to the balancing point by the force. By mounting the shaft 3 in this way, the pump in the present invention can omit a pair of radius direction electromagnet and radius direction sensor and two pairs of gain/phase compensating circuits and electromagnet driving circuits as compared with the construction of the conventional five axes controlled type of magnetic bearing. Therefore, the present invention can provide a smaller and less expensive pump with higher reliability since the number of parts is reduced to about three-fifths of that of the conventional type.

A bell-shaped pump rotor 9 with radial-extending blades is connected to the shaft 3 supported by the magnetic bearing in such a way that it covers the whole of the shaft 3 and the magnetic bearing. The pump rotor 9 has a tubular portion which carries the radially-extending blades and the rotor is rotated at high speed by the use of an inner-rotor type of a driving motor 10 provided between the radius direction electromagnet 2 and the axial direction electromagnet 7. A flow of gas molecules from an intake port 11 to an exhaust port 12 is caused by the coaction of the blades of the rotating rotor 9 and a set of fixed blades 13 to act as a vacuum pump. Since the rotor 9 is configured to cover the whole of the shaft 3 and the magnetic bearing, the flow of gas molecules is not interrupted as it travels through the pump between the intake and exhaust ports. Furthermore, components such as electromagnets and motors which have the possibility to produce gases are disposed in the low vacuum side and no oil lubricated type of bearing is used. Therefore, a perfectly oil-free, high vacuum can be provided efficiently.

In order to rotate the pump rotor 9 at high speed, the pump is arranged to endure centrifugal force acting on the rotating rotor 9 at high speed as described in the following. The driving motor comprises an inner-rotor system having a rotor 14 the outer diameter of which is kept as small as possible, and the axial electromagnet 7 has a divided yoke the outer magnetic pole of which is positioned closer to the inner magnetic pole than the outer diameter of the axial solenoid coil 20 so as to keep the outer diameter of the armature-disc 8 in small size, and the rotor side permanent electromagnets 5 are pressed into a rotor side permanent magnet holer 15 secured to the disc 8.

Figure 2:
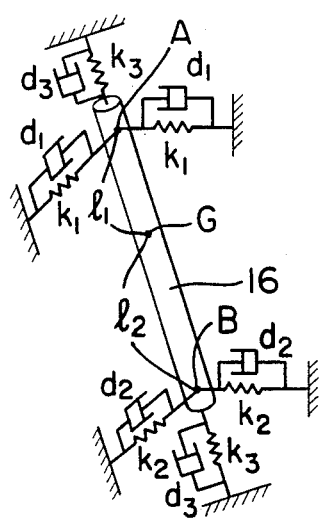
FIG. 2 is a view showing a schematic equivalent system of the magnetic bearing of the present invention.

The stable rotation realized by this magnetic bearing system will be described in conjunction with FIG. 2. FIG. 2 is a schematic view showing the bearing portion of the pump of the present invention by the use of springs and a damper. The function of the radius direction magnetic bearing comprising the radius direction displacement sensor 1, the radius direction electromagnet 2 and the electric circuits is expressed by the use of two sets of a spring constant $K_1$ and an attenuation constant $d_1$ each extending in the radius direction. The function of the axial direction bearing comprising the axial displacement sensor 6, the axial electromagnet 7, the permanent magnets 4, 5 and the electric circuit is expressed by the use of one set of a spring constant $K_3$ and an attenuation constant $d_3$ extending in the axial direction and one set of a spring constant $K_2$ and two sets of attenuation constant $d_2$ extending in the radius direction. In this case, since the constants $d_1$ and $d_3$ can be determined actively by the circuits, it is possible to set them at large values. On the other hand, since no active attenuation is acted on the constant $d_2$ due to the attenuation elements of the righting moment in the radius direction passively created by the attracting force of the axial electromagnet 7 and by the attracting force of the stator and rotor side permanent electromagnets 4 and 5, the constant $d_2$ is little more than zero as compared with those of $d_1$ and $d_3$ ($d_2 < < d_1, d_3$). The movement of the shaft 3 can be separated into axial direction and radius direction components. Since the movement in the axial direction is perfectly controlled actively, the following description is restricted to the movement in the radius direction. In FIG. 2, the rotating body 16 represents the whole of the rotating parts in FIG. 1 such as the shaft 3, the rotor 9, the rotor side permanent magnets 5, the armature-disc 8, the rotor side permanent magnet holder 15, etc. Assuming that the center of gravity of the rotating body 16 is G, the points of action of the spring constants $K_1$ and $K_2$ are A and B, respectively, $l_1$ is the distance between G and A, $l_2$ is the distance between G and B, $\omega$ is the rotational speed, m is the mass, Ir is the inertial moment in the radius direction, Ia is the inertial moment in the axial direction, x, y, z are rectangular coordinate axes, the rotational angles around the axes x, y and z are $\theta_x$, $\theta_y$ and $\theta_z$, respectively, x, y are the displaced amount from the balancing point of the center of gravity G of the rotating body, and $\theta_x$, $\theta_y$ are the inclination of the rotor axis. Then the equation of motion of the rotating body 16 in the radius direction is expressed as follows:

$$\frac{d}{dt}\begin{pmatrix} Z \\ \dot{Z} \\ \theta \\ \dot{\theta} \end{pmatrix} = \begin{pmatrix} 0 & 1 & 0 & 0 \\ -(k_1+k_2)/m & -(d_1+d_2)/m & -j(k_1l_1-k_2l_2)/m & -j(d_1l_1-d_2l_2)/m \\ 0 & 0 & 0 & 1 \\ -j(k_1l_1-k_2l_2)/Ir & j(d_1l_1-d_2l_2)/Ir & -(k_1l_1^2+k_2l_2^2)/Ir & -(d_1l_1^2+d_2l_2^2)/Ir+jIa\omega/Ir \end{pmatrix} \begin{pmatrix} Z \\ \dot{Z} \\ \theta \\ \dot{\theta} \end{pmatrix} \quad (1)$$

$Z = x + jy$
$\theta = \theta x + j\theta y$

Where, $-(K_1+K_2)/m$ and $-(d_1+d_2)m$ correspond to the spring constant and attenuation constant concerning translation of the center of gravity G, and $-(K_1l_1^2+K_2l_2^2)/Ir$ and $-(d_1l_1^2+d_2l_2^2)/Ir+jIa\omega/Ir$ correspond to the spring constant and attenuation constant concerning rotational motion around the center of gravity. Further $-j(K_1l_1-K_2l_2)/m$, $-j(d_1l_1-d_2l_2)/m$, $j(K_1l_1-K_2l_2)/Ir$, $j((d_1l_1-d_2l_2)/Ir$ are terms relating to the interaction of the translation of, and the rotational motion around, the center of gravity.

Since the attenuation constants of the translation of, and the rotational movement around, the center of gravity are related to the sum of $d_1$ and $d_2$ or $d_1l_1^2$ and $d_2l_2^2$, satisfactory values can be set to those constants by adopting $d_1$ even if the value of $d_2$ is almost zero. Therefore, a stable rotation can be also realized by the magnetic bearing of the present invention. Further, if the position of the center of gravity G of the rotating body, the spring constant $K_1$ of the radius direction bearing in the radius direction, and the passive spring constant $K_2$ of the axial bearing in the radius direction are properly set in such a way that $K_1l_1$ equals $K_2l_2$, in other words, if the distance AB is divided into $K_2$ and $K_1$ by the point G, the two resonating points in this system approach nearest to each other since no term of counteraction between translation and rotational motion exists as is obvious in case both $d_1$ and $d_2$ are zero in the equation (1). Therefore, since vibration provoked by the above counteraction is eliminated and the attenuation rates concerning the two motion modes come to approximate values, increasing the rotational speed beyond the resonance point of the two systems can be attained more easily. A further advantage is that the shaft 3 is kept level in the state of $K_1l_1=K_2l_2$ when the turbo-molecular pump in FIG. 1 is fixed in such a manner that the gravity exists in the lateral direction of FIG. 1.

On rotating the rotating body at high speed, as is well known, the rotation sometimes happens to be unstable in case interior attenuation exists in the body to cause self-vibration. The rotational speed at where the self-vibration occurs is related to the ratio of the inertial moments of the rotating body Ia/Ir and also the ratio $\tau o/\tau i$ of the outer attenuation $\tau o$ to the inner attenuation $\tau i$, and the rotational speed at where the self-vibration occurs increases in proportion to the increase of these ratios. In this case, the inner attenuation relates to energy consumption in the rotating body and is provoked by friction among the components and eddy currents flowing in the components; whereas, the outer attenuation relates to energy consumption occurring at the stator side other than the rotating body as a result of the motion of the rotating body, and it is provoked by the attenuation activity produced by the circuits and by eddy currents flowing into the stator side.

Now, considering the attenuation by eddy currents, the present invention is constructed so as not to produce self-vibration within a predetermined rotational speed by increasing the ration $\tau o/\tau i$ by employing non-magnetic electric conductive materials such as aluminum for a stator side supporter or support member 17 for supporting the stator side permanent magnet 4, the axial direction electromagnet 7, the driving motor 10 and the radius direction electromagnet 2 and, on the other hand, by employing non-magnetic, low electric conductive materials such as stainless steel for the rotor side permanent magnet holder 15 supporting the rotor side electromagnet 5 and other parts except the rotor 14 of the motor of the shaft 3, the radius direction electromagnet rotating portion 18 and the radius direction displacement sensor target portion 19. Though aluminum and stainless steel are used in the present invention, for increasing the rotational speed to provoke self-vibration, it is preferable to select, within an allowable range in view of strength, the most and the least electrically conductive non-magnetic materials. Further, by using non-magnetic materials for the portions not related to the motor of the shaft 3, the electromagnet and the sensor, the attracting force due to leakage flux from the axial direction electromagnet can be prevented from affecting the shaft 3.

Figure 3:
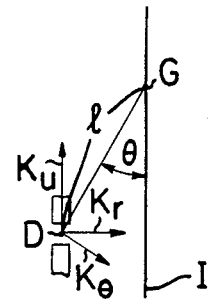
FIG. 3 is an explanatory view explaining the relationship among the spring constant in the radius direction, the stable spring constant in the axial direction, and the rotational spring constant around the center of gravity.

In FIG. 3, assuming that G is the center of gravity of the rotating body, D is an opposite position to an axial electromagnet or a permanent magnet, l is the distance between G and D, $\theta$ is an angle formed between the rotating axis passing through G in the balanced state and GD, Kr is a spring constant in the passive radius direction, and Ku is an unstable spring constant in the rotational axis I direction. Then the rotational spring constant $K\theta$ for the rotation around the center of gravity G is expressed as follows:

$$K\theta = Krl^2 \cos^2\theta \left(1 - \tfrac{1}{2}\frac{ku}{kr}\tan^2\theta\right) \quad (2)$$

Therefore, to enlarge $K\theta$, l should be long and $\theta$ should be small as well as to increase Kr. In the present invention, as above described in diminishing the size of the outer diameter of the armature-disc 8, the outer magnetic pole is arranged to be as close to the inner magnetic pole as possible by dividing the yoke of the axial direction electromagnet 7 so that the value of $\theta$ at each magnetic pole position may be kept small and $K\theta$ may increase.

Figure 4:
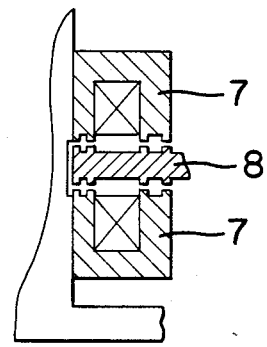
FIGS. 4, 5 and 6 are longitudinal sectional views of bearing portions used in other embodiments of the present invention.
Figure 5:
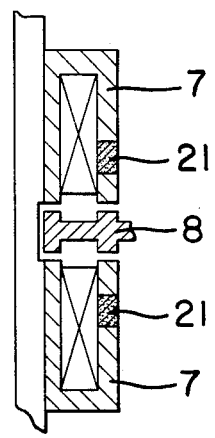
Figure 6:
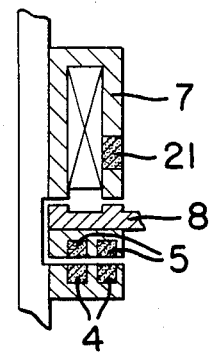

In addition to the description of the above embodiment, the bearing portion which functions to support the axial direction actively as well as to constrainingly support the radius direction passively can be arranged in different ways. In FIG. 4, two opposed axial direction electromagnets are provided, in FIG. 5, bias flux is generated by inserting permanent magnets 21 into the yoke of the axial direction electromagnet, and in FIG. 6, one side is opposed to the permanent magnet as in the FIG. 1 embodiment and into the other side of the yoke of the axial direction electromagnet, the permanent magnet 21 is inserted so as to generate bias flux also by the permanent magnet.

According to the present invention, by constructing the pump as above described, a turbo-molecular pump having the merits of oil-free operation and high reliability, miniaturization, high capacity and low cost can be realized since the bearing construction and circuits are simplified, and stable rotation at higher speed can be attained as compared with a turbo-molecular pump adopting the conventional five axes controlled type of magnetic bearing.

We claim:

1. A turbo-molecular pump comprising: a housing having an inlet for introducing gaseous molecules during use of the pump and an outlet for discharging the gaseous molecules; a set of fixed blades fixedly mounted within the housing and extending radially thereof; a pump rotor rotatably disposed within the housing to undergo rotation about a rotary axis and having a tubular portion carrying a set of radially-extending blades which coact with the fixed blades to pump gaseous molecules from the inlet to the outlet during rotation of the pump rotor, the pump rotor together with the parts connected to rotate therewith having a center of gravity lying along the length of the pump rotor between the opposite axial ends thereof, magnetic bearing means disposed interiorly of the pump rotor tubular portion for magnetically rotatably supporting the pump rotor in the housing in a given balanced state, the magnetic bearing means comprising active magnetic radial bearing means disposed along the length of the pump rotor on one side of the center of gravity for actively controlling the radial position of the pump rotor along two orthogonal axes, active magnetic axial bearing means disposed along the length of the pump rotor on the other side of the center of gravity for actively controlling the axial position of the pump rotor along the rotary axis, and passive magnetic radial bearing means disposed on the said other side of the center of gravity and coacting with the active magnetic axial bearing means for passively controlling the radial position of the pump rotor; and driving means disposed interiorly of the pump rotor tubular portion for rotationally driving the pump rotor.

2. A turbo-molecular pump according to claim 1; wherein the active magnetic axial bearing means comprises a stationary energizeable electromagnet having a yoke, and an armature carried by the pump rotor and coacting with the electromagnet to effect axial displacement of the pump rotor in one axial direction, and magnetic means for effecting axial displacement of the pump rotor in the opposite axial direction.

3. A turbo-molecular pump according to claim 2; wherein the passive magnetic radial bearing means comprises a set of permanent magnets connected to the pump rotor, and another set of stationary permanent magnets.

4. A turbo-molecular pump according to claim 3; wherein the sets of permanent magnets comprise the magnetic means of the active magnetic axial bearing means.

5. A turbo-molecular pump according to claim 2; wherein the driving means comprises a rotary drive motor having a motor rotor connected to the pump rotor, and a motor stator disposed interiorly of the pump rotor tubular portion and radially spaced from the motor rotor.

6. A turbo-molecular pump according to claim 2; including a stationary support member extending axially along the length of the pump rotor interiorly of the pump rotor tubular portion, the support member being composed of non-magnetic electrically conductive material and supporting the stationary parts of the magnetic bearing means and the driving means.

* * * * *